Nov. 17, 1964   G. JENSON   3,157,385
BLADE LOCKING MEANS FOR TURBINES OR COMPRESSORS
Filed Sept. 24, 1962

3,157,385
BLADE LOCKING MEANS FOR TURBINES OR COMPRESSORS

George Jenson, Manchester, England, assignor to Associated Electrical Industries Limited, London, England, a British company
Filed Sept. 24, 1962, Ser. No. 225,635
Claims priority, application Great Britain Oct. 17, 1961
3 Claims. (Cl. 253—77)

This invention relates to means for locking in position the blades of turbines or compressors to prevent their movement in an axial direction, of the kind in which the blades have an axial or skew-axial root fixing in slots around the periphery of the rotor, the slot being formed with an overhanging shoulder or shoulders preventing removal of the blade from its slot in a radially outward direction. Such an attachment assembly is herein referred to as "of the shoulder type" and is exemplified by the well-known fir tree assembly.

According to the invention, a rotor blade attachment assembly of the shoulder type is provided with locking means comprising an annular dovetail groove in each end face of the rotor disc adjacent the bottoms of the fixing slots and into which the ends of the fixing slots extend, dovetail section packers fitting each groove, the length of the packers being such that they can be passed axially into the end of a slot adjacent the groove and slid circumferentially in the groove into close fitting positions between each pair of blade roots in which positions those adjacent each rotor slot overlap the retaining lobes on the side of the blade root leaving a gap central therewith, and a locking plate extending through the slot between the tip of the root and the bottom of the slot, the ends of the plate being bent radially outward to lie over the ends of the root in the gap between the packers.

Preferably the length of the blade roots is the same as that of the rotor disc and the ends of the blade roots are reduced in length axially so as to provide at each end recesses of sufficient depth to receive the packers and the ends of the locking plates without any part of the locking means protruding outside the rotor body.

The locking plate may be preformed with one end bent up before assembly in the rotor or a flat strip may be used in which case both ends will be bent radially after insertion of the blade root and packers on the rotor body.

Figure 1:
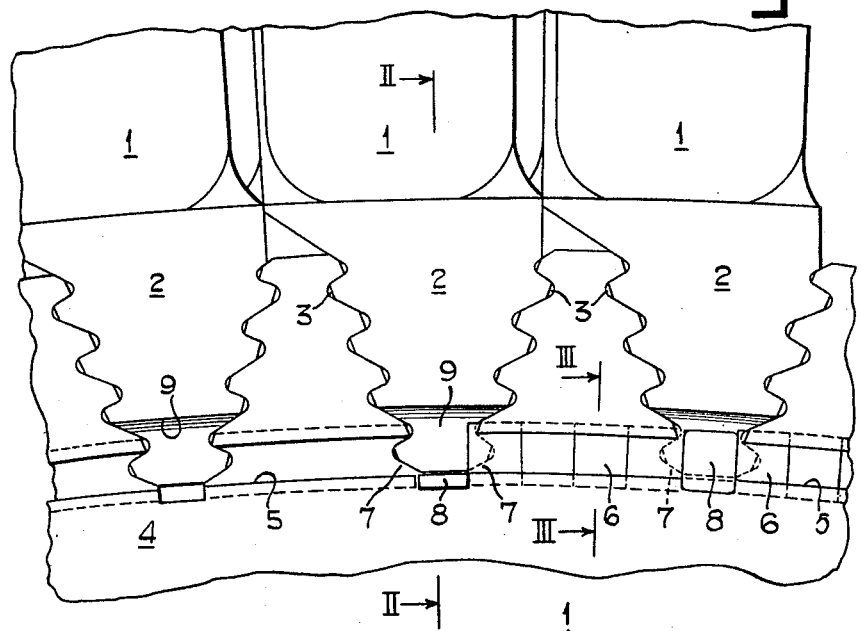
Figure 2:
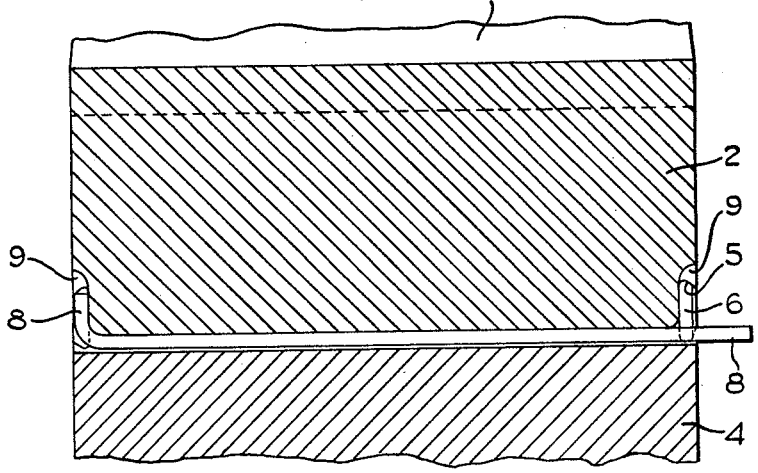
Figure 3:
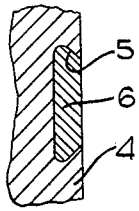

The invention will be more clearly appreciated from the following description of the accompanying drawings in which FIG. 1 is an elevation, viewed axially, of part of a machine rotor showing three blade roots of the fir tree type retained in slots in the rotor, FIG. 2 is a section on line II—II of FIG. 1, and FIG. 3 is a detailed section on line III—III of FIG. 1.

In the well known manner rotor blades 1 are provided with roots 2 of fir tree type which fit into slots 3 cut in a generally axial direction in the periphery of a rotor body 4, the blades thereby being prevented from moving radially outwards.

In both end faces adjacent the bottoms of slots 3 the body 4 is provided with an annular dovetail groove 5 as best seen in FIG. 3. The ends of the slots 3 extend into the groove 5. Packers 6 of the same dovetail section are inserted in each groove 5. The length of the packers is such as to enable them to be passed axially into the narrower (or inner) end of slots 3, and when slid circumferentially into close fitting positions in groove 5 that they will overlap the retaining lobes on the blade root leaving a central gap. As seen in FIG. 1 the packers 6 are fitted close together between each pair of roots 2, the end ones overlapping lobes 7 on each side of the root and being separated by the end of a locking plate 8. Four packers are illustrated but any suitable number may be used to suit particular cases.

To prevent movement of the packers in the annular groove a locking plate 8 is inserted beneath each blade from one end face of body 4. Such locking plates are well known for blade locking and are commonly preformed with one end bent up (FIG. 2). After insertion in groove 3 the plate is locked in position by bending the other end radially outwards over the end of root 2. The outwardly bent ends of the plates fit between packers 6 and maintain a rigid assembly in which any axial force exerted on the blades is taken up by the dovetail packers fitting closely in grooves 5. The plates 8 do not need to be sufficiently strong to resist such force and can be made of cheap expendable material.

As seen in FIG. 2, the end of the blade root is cut back so as to reduce its length and provide at each end recesses 9 of sufficient depth to receive the packers and ends of plates 8; thus no part of the blade locking means protrudes outside body 4.

Although the invention has been illustrated and described with reference to a fir tree serrated shape of blade root, it may equally well be applied to other shapes in which the blade is prevented from moving radially outwards by the action of any undercut surface, such fittings being well known in themselves and not needing further description.

What I claim is:
1. A turbo-machine bladed rotor disc, comprising:
   (a) a central disc;
   (b) a multiplicity of blade elements, each including a blade and a root at one end of the blade;
   (c) an equal multiplicity of substantially axially directed slots in and spaced evenly around the periphery of the disc, the roots of the blades being inserted axially into the slots and each slot and root having sides of complementary shapes which cooperate to prevent radial movement of the blade element;
   (d) an annular dovetail groove in each axially directed face of the disc, the radius of the radially innermost edge of the groove being at least equal to the radius of a hypothetical circle joining the bases of the slots, so that the groove opens into each slots;
   (e) a multiplicity of packers of dovetail section fitting the grooves, the length of each in the circumferential direction of the rotor being such that it can be passed in an axial direction into the base of a slot and slid circumferentially into the groove;
   (f) a locking plate extending through each slot between the tip of the blade root and the base of the slot, each end of the plate being bent radially outward to lie over a part, circumferentially, of the width of the end of the root, the packers occupying close-fitting positions in the grooves between the ends of the locking plates, and at least one of the packers adjacent to each locking plate overlapping the remainder of the end of the root.

2. A rotor according to claim 1, in which the axial length of each said blade root is the same as that of said rotor disc and the tips of said roots are reduced in length axially thereby to provide at each end a recess of sufficient depth to receive said packers and said locking plate end without any of said parts protruding outside the rotor disc.

3. A rotor disc according to claim 1, in which said blade roots are formed with a serrated profile of fir-tree type, said slots are formed with a corresponding serrated profile and said blade roots are disposed in said slots.

References Cited in the file of this patent

UNITED STATES PATENTS

| | | |
|---|---|---|
| 2,713,991 | Secord et al. | July 26, 1955 |
| 2,755,063 | Wilkinson | July 17, 1956 |
| 2,761,648 | Purvis | Sept. 4, 1956 |
| 2,994,507 | Keller et al. | Aug. 1, 1961 |
| 3,039,740 | Hockert et al. | June 19, 1962 |
| 3,045,329 | Carli et al. | July 24, 1962 |